(12) United States Patent
Orr

(10) Patent No.: US 11,373,019 B2
(45) Date of Patent: Jun. 28, 2022

(54) SCALABLE CONVENTION FOR DATA PROPERTIES IN NUMERICAL COMPUTING

(71) Applicant: Xplicit Computing, Inc., Mountain View, CA (US)

(72) Inventor: Graham Jaffe Orr, Mountain View, CA (US)

(73) Assignee: Xplicit Computing, Inc., Mountain View, CA (US)

( * ) Notice: Subject to any disclaimer, the term of this patent is extended or adjusted under 35 U.S.C. 154(b) by 406 days.

(21) Appl. No.: 16/513,327

(22) Filed: Jul. 16, 2019

(65) Prior Publication Data

US 2020/0019657 A1 Jan. 16, 2020

Related U.S. Application Data

(60) Provisional application No. 62/698,818, filed on Jul. 16, 2018.

(51) Int. Cl.
*G06F 30/20* (2020.01)
*G06F 16/901* (2019.01)

(52) U.S. Cl.
CPC ............ *G06F 30/20* (2020.01); *G06F 16/901* (2019.01)

(58) Field of Classification Search
CPC ..... G06F 30/20; G06F 16/901; G06F 16/9017
See application file for complete search history.

(56) References Cited

U.S. PATENT DOCUMENTS

| | | | |
|---|---|---|---|
| 2013/0124559 A1* | 5/2013 | Hansen | G06F 16/148 707/769 |
| 2018/0314780 A1* | 11/2018 | Bertilsson | G06F 30/23 |
| 2018/0315053 A1* | 11/2018 | Schukai | G06Q 20/4014 |
| 2020/0210419 A1* | 7/2020 | Pidduck | G06F 16/9027 |
| 2021/0263919 A1* | 8/2021 | Ginzburg | G06F 16/27 |

* cited by examiner

*Primary Examiner* — Chuen-Meei Gan
(74) *Attorney, Agent, or Firm* — Fenwick & West LLP

(57) ABSTRACT

A simulation system receives a request to retrieve simulation data from memory of a computing system. The received request includes a property key identifying the simulation data to be retrieved. The property key is searched in a map storing associations between a plurality of property keys and memory where simulation data associated with a corresponding property key is stored. The memory for the requested simulation data accessed to obtain the requested simulation data.

20 Claims, 16 Drawing Sheets

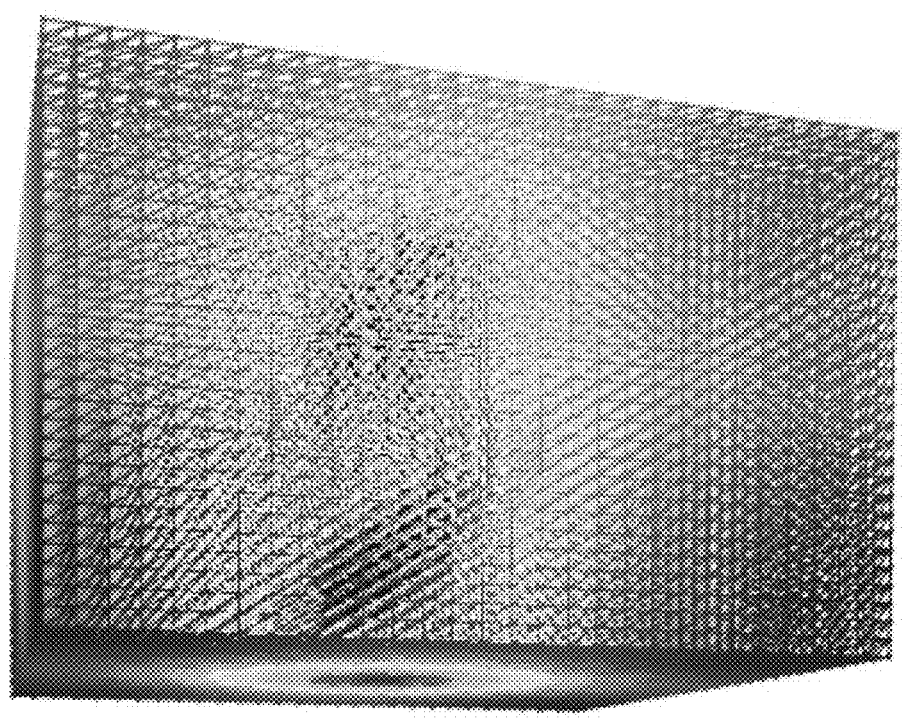
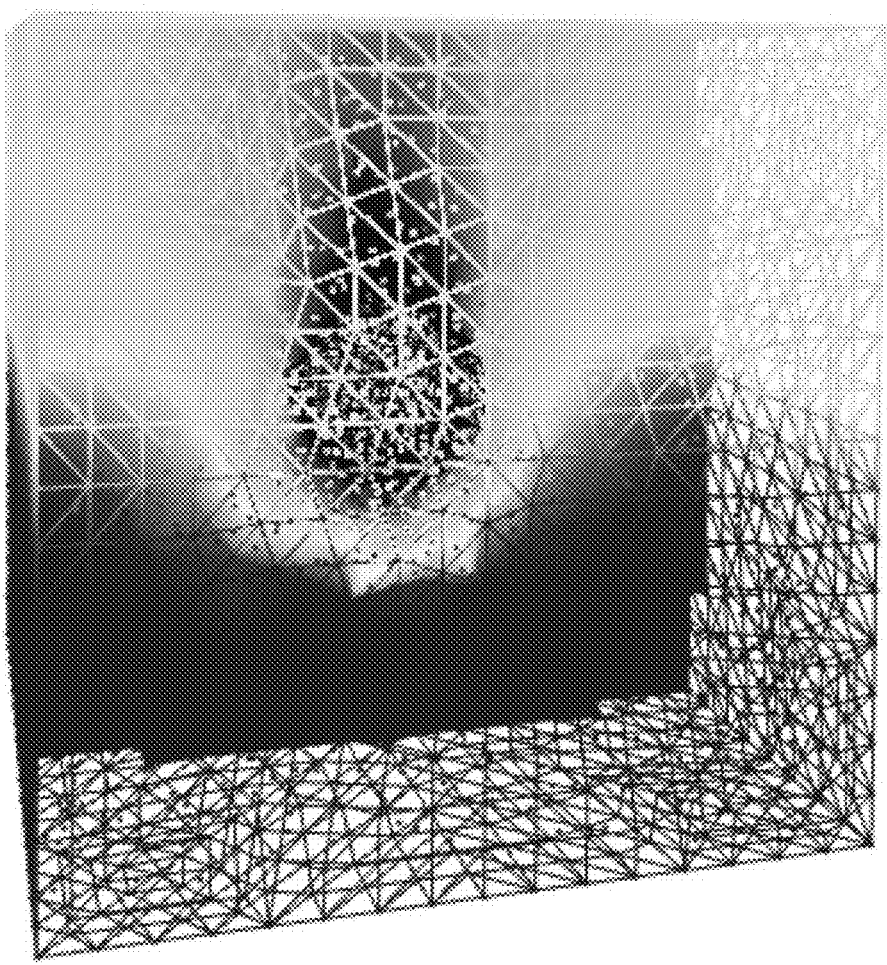
FIG. 2

```
void exampleAlgorithm(Data& data, PropertyKey pk) {
910 →  if (!data.contains(pk))                    // check if data contains pk
         return;
930 →  auto& array = data(pk);                    // access databse using pk
920 →  auto pk_mod = {pk, Modifiers::modifier};   // make a new property key by
                                                  // appending a modifier
930 →  auto& array_mod = data(pk_mod);            // access database for pk_mod
940 →  // do some computation using arrays
950 →  // store result of computation
}
```

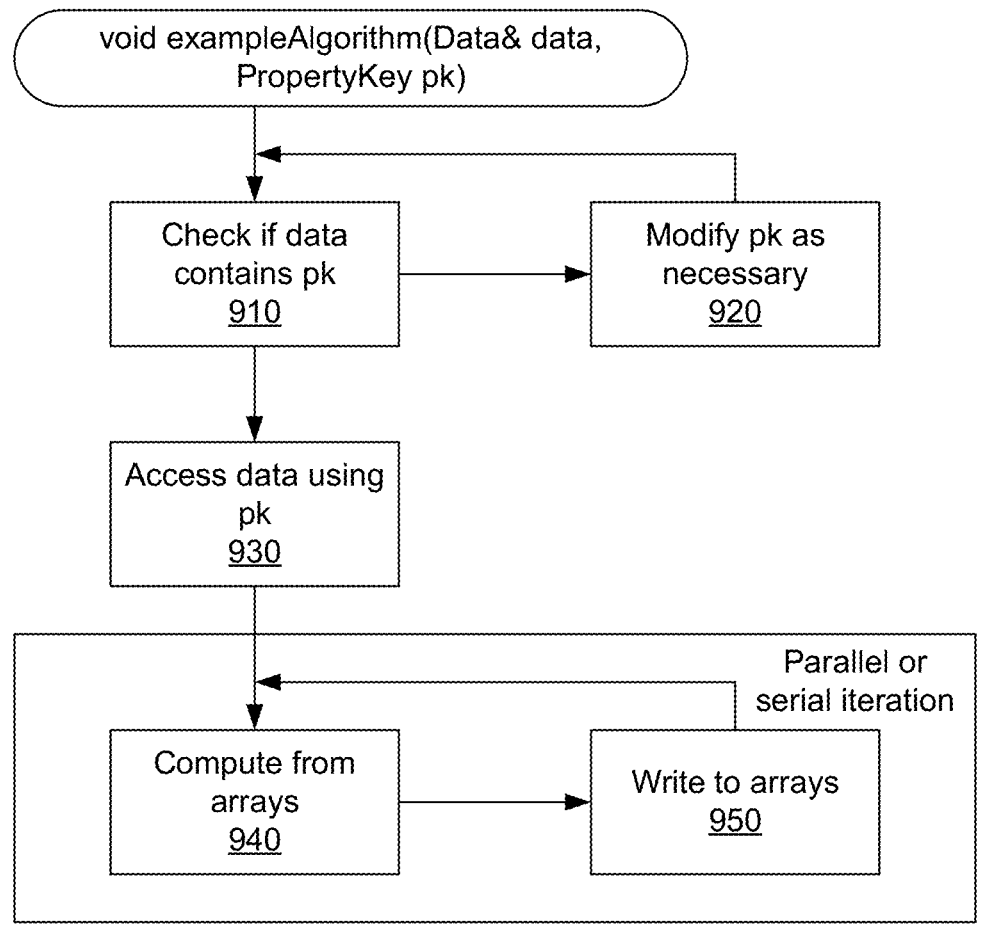

FIG. 9

SCALABLE CONVENTION FOR DATA PROPERTIES IN NUMERICAL COMPUTING

CROSS REFERENCE TO RELATED APPLICATIONS

This application claims the benefit of U.S. Provisional Application No. 62/698,818, filed Jul. 16, 2018, which is incorporated by reference in its entirety.

BACKGROUND

This disclosure relates generally to computer simulations and physical modeling, and more specifically to an improved scheme for storing and retrieving data in numerical computing applications.

Computer simulations store, access, and process upon a large amount of data. For instance, a simple computer simulation may use position coordinates, mass and energy density, pressure, and temperature scalars for every node of a simulation domain, and every time step of a time sweep. Given the large amount of data being used and the frequency of access, retrieving simulation data may comprise a large fraction of computer operating overhead. In particular, for dynamic databases, the simulation system searches for a memory address of the data being accessed. The time spent performing the lookup increase as the amount of data being stored increases. Thus, there is a need for a systematic way of sorting and storing large datasets, whilst maintaining insertion, access, and deletion flexibility and performance for users and automated algorithms.

SUMMARY

A simulation system receives a request to retrieve simulation data from memory of a computing system. The received request includes a "property key" identifying the simulation data to be retrieved. The property key is searched in a map storing associations between a plurality of property keys and memory address or container where simulation data associated with a corresponding property key is stored. If the entry for the requested simulation data is matched, the memory is accessed to obtain the requested simulation data.

In some embodiments, property keys include a property and one or more modifiers. The property key may be a fixed sized tuple (i.e., one property and one modifier) or may be dynamic (i.e., one property and an indeterminate number of modifiers). Other variations such as multiple properties and multiple modifiers may also be implemented in specialized contexts. The property is often a noun, indicating the physical quantity being represented by the simulation data associated with the property key. For example, the property may indicate that the simulation data is a: pressure data, temperature data, mass data, energy data, position data, and the like. The modifier can be an adjective, noun, or verb, indicating operations that were previously applied to some related quantity. For example, the modifiers may indicate that the simulation is the value of the physical quantity, a residual value of the physical quantity, a gradient of the physical quantity, a rate of change of the physical quantity, a mean of the physical quantity, a maximum value of the physical quantity, a minimum value of the physical quantity, and the like.

More concrete examples could include {pressure} and {pressure, gradient}, or {position} and {position, DT} to indicate derivatives and the like. Concatenation of multiple modifiers can track dataset operations in a semi-unique property "key-chain".

In some embodiments, the property key is searched in the map by comparing the property key to stored property keys used as look-up handles to entries in the data map. Property keys are lexicographically compared based on a self-sorted ordering of properties and modifiers. That is, in one embodiment, during initialization of the system and/or prior to usage, as unique properties and modifiers are constructed an ordering is defined by the simulation system. In one embodiment, this order can be simply defined as the address of the property or modifier object. In another embodiment, the order is defined by assigning an index or floating-point identifier or unique string literal (e.g. name) to each property and modifier supported by the system.

This provides a flexible and high-performance scheme and interface for numerical computing applications. It enables dynamic attribute management and fast data referencing to host and/or device arrays. A data map can leverage serial logarithmic lookup through many attributes, returning contiguous host and device arrays for parallel computation and assignment.

BRIEF DESCRIPTION OF THE DRAWINGS

FIG. 2 illustrates an example of an inter-domain mutual coupling between disparate geometry types (unstructured mesh and structured grid), according to one embodiment.

FIG. 9 illustrates a flow diagram of an example algorithm using the data access disclosed herein.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Figure 1:
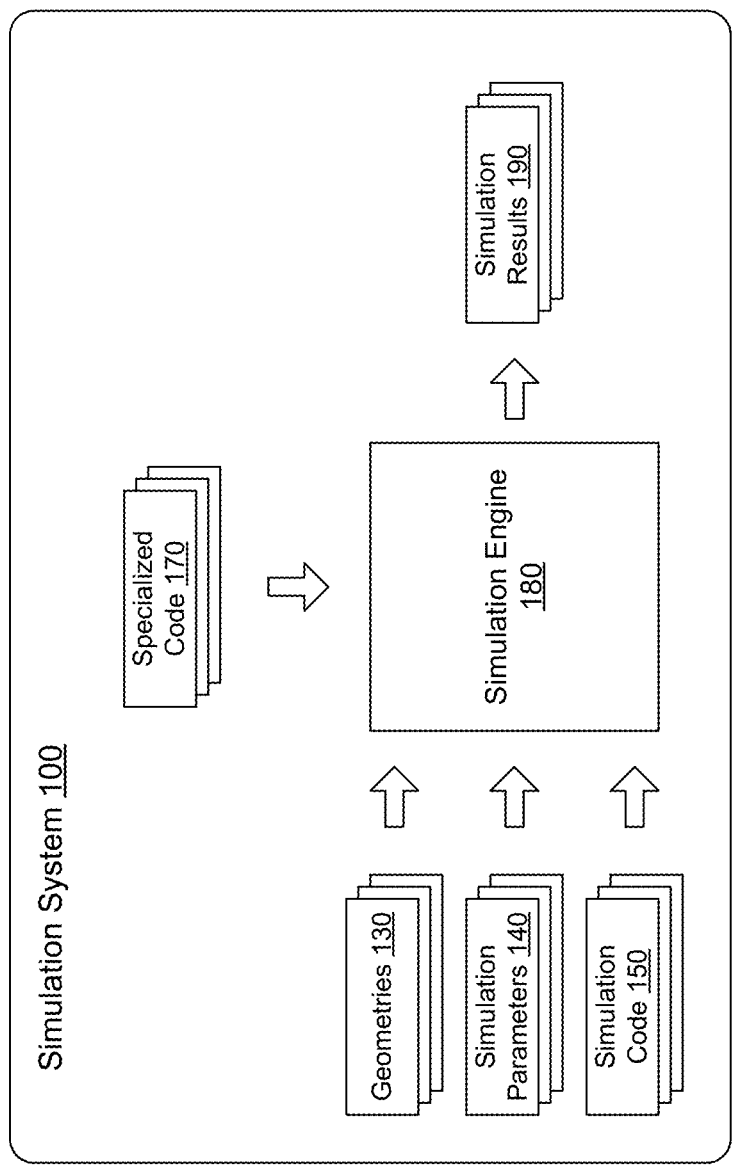
FIG. 1 illustrates an overview of a simulation system, according to one embodiment.

FIG. 1 illustrates an overview of a simulation system 100, according to one embodiment. A simulation engine 180 performs a simulation of a system based on a geometry 130, simulations parameters 140, and a simulation code 150. For instance, the geometry 130 defines a set of spatial nodes and topological elements in the simulated system, and the simulation code 150 defines a set of numerical algorithms (such as transport processes and state equations) to be solved for every node in the geometry 130. The simulation code 150 may further specify a parameter sweep (e.g., a time sweep or a temperature sweep) to be performed by the simulation engine.

The simulation parameters 140 are used to configure the simulation engine 180. For example, the simulation parameters 140 may specify a default numerical solver to be used by the physical models defined by the simulation code 150. The simulation parameters 140 may further specify a convergence condition (e.g., an acceptable margin of error) and a number of iterations before the simulation timeouts.

The simulation code 150 may be geometry agnostic or compatible across multiple types. That is, in one embodiment, the simulation code 150 is not specific to any geometry type (e.g. mesh, grid, etc). Instead, the simulation engine identifies a geometry specific implementation of the functions included in the simulation code 150 on the fly and redirects the interface functions to the specialized implementations for execution.

The simulation engine 180 uses a set of specialized codes 170 to execute the simulation code 150. The specialized code 170 includes code that is specific to geometry type. For example, specialized code 170 includes code that is specific to structured geometry types, and includes code that is specific to unstructured geometry types to provide access to specialized functions otherwise irrelevant to other types. This results in type-specific algorithms to operate only on a kind of geometry, in addition to type-agnostic algorithms compatible through the common interface. In some embodiments, within the code specific for structured geometry types, the specialized code 170 may include code for grid geometries and code for tree geometries. Moreover, within the code specific for unstructured geometry types, the specialized code 170 may include code for mesh geometries and network geometries.

In some embodiments, the simulation system may be an application specific integrated circuit (ASIC) or field programmable gate array (FPGA). In this embodiment, the specialized code 170 is implemented as specialized circuitry that implements the functionality for executing generic instructions provided by the simulation code 150. Additionally, the simulation system can generate equivalent kernel source code for external co-processor device and set kernel arguments on the device prior to execution. The simulation system can then read device buffers and update the master data on the host system. This functionality allows the simulation system to utilize heterogeneous resources while allowing the use of an agnostic interface using static and/or dynamic compilation and function dispatching.

FIG. 2 is an example of an inter-domain mutual coupling between disparate geometry types, according to one embodiment. The example of FIG. 2 shows an unstructured mesh on the left and a structured grid on the right, running two independent numerical methods coupled in time and space. The example simulation shown includes a cylinder placed inside a viscid gas flow, with wake visible through domains. Generalized mediation and coupling between dissimilar physics simulations requires a unified data access pattern across domains.

For each node within the domains being simulated, the simulation system stores simulation data. For example, for each node within a fluid analysis, the simulation system may store temperature data, pressure data, mass data, energy data, position data, and the like. Moreover, for some of the stored data, the simulation system may store the actual value of the data and a modified version of the data. For instance, the simulation system, in addition to the value of some scalar field, may store residual, gradient, rate of change, a mean, a max value, a min value, and the like sharing the same property across multiple unique property-keys.

The data may be stored as a vector or matrix, where each element of the vector corresponds to a node or element in the geometry. The data stored may be of templated or concrete type. In some embodiments, the data stored may be of non-numerical values, such as supporting documents and spreadsheets. The data may be stored in containers that manage host (CPU) arrays and/or device (GPU) arrays using an incremented revision system.

As data is generated by the simulation system, data is stored at various locations in memory. That is, when new data is generated, the simulation system instructs the operating system of a computing system to allocate memory for storing the data. The operating system provides the simulation system the memory address of the allocated memory and the simulation system instructs the operating system to store the data in the received memory address or container.

In order to retrieve the stored simulation data, the simulation system stores the allocated memory address or container for storing the simulation data. In particular, the simulation system stores a mapping between the memory entry and information identifying the data being stored in memory. For example, if the simulation system is storing pressure data, the simulation system stores a map or association between the memory allocated by the operating system for storing the floating-point pressure data, and information identifying the pressure data being stored.

System Architecture

Figure 3:
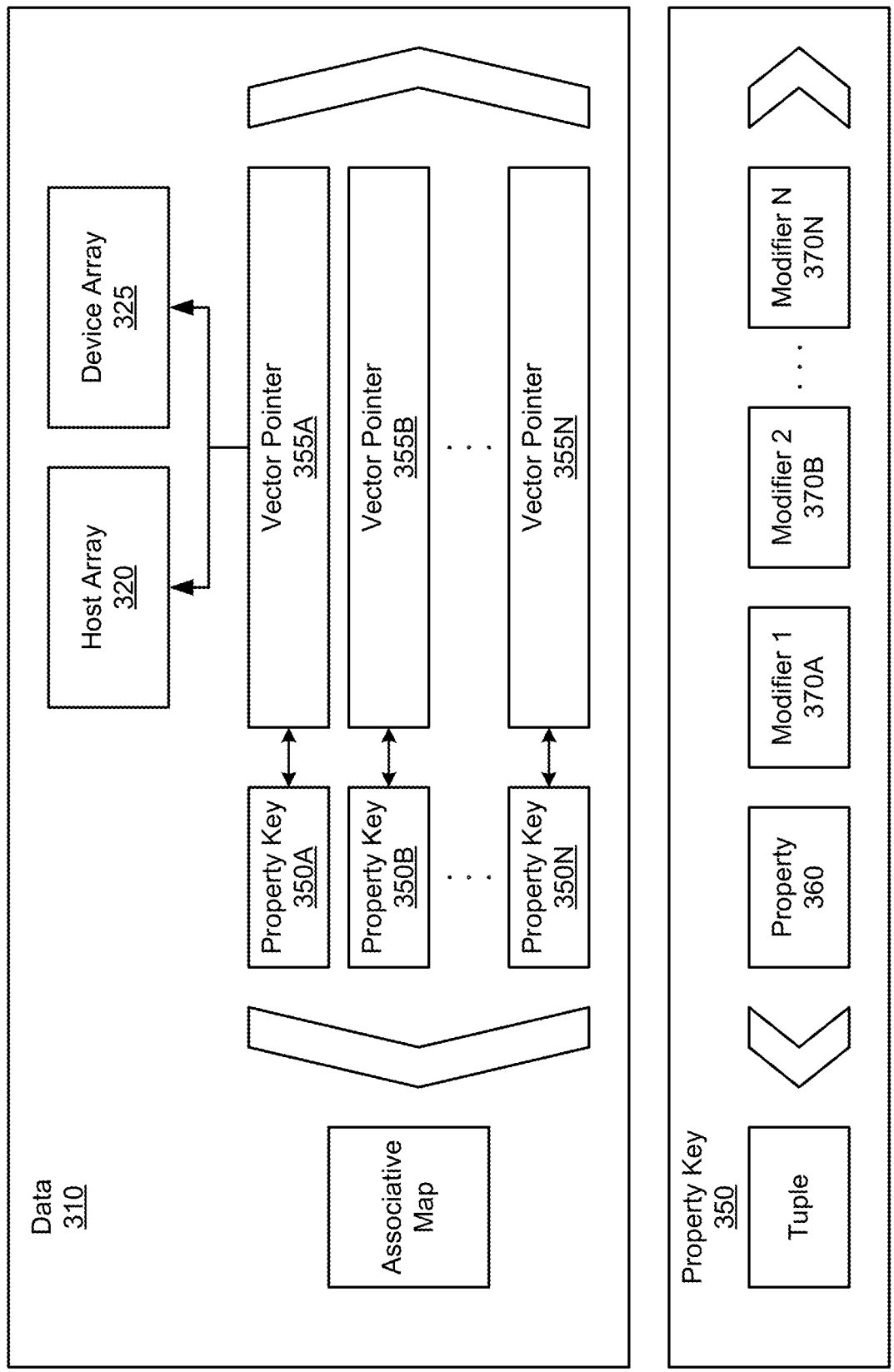
FIG. 3 illustrates a block diagram of the data structure for storing simulation data, according to one embodiment. The mapped entry can be a container or pointer to numerical or non-numerical values.

FIG. 3 illustrates a block diagram of the data structure for storing simulation data, according to one embodiment. The simulation system stores a data structure data 310. Data 310 is an associative map that stores an association between property keys 350 identifying the data being stored and memory address or container 355 where the data is being stored. For instance, the memory address can be stored as a pointer to be dereferenced. In some embodiments, the vector 355 points to a host array 320 and/or a device array 325. In some embodiments, the vector 355 is a data container or class that includes multiple fields for storing the simulation data in the host array 320 and the device array 325. Moreover, the data container or class may further include functions to enable data synchronization between the host array and device array. A host array 320 is a contiguous central processing unit (CPU or similar) memory. A device array 325 is a contiguous co-processor (GPU or similar) memory. In some embodiments, the simulation system further stores revision information associated with the host array 320 and the device array 325 to facilitate synchronization across buffers.

The property keys 350 are unique keys that include an identification of a property and identifications of any number of modifiers, or in some embodiments any number and combination thereof. In some embodiments, a property key 350 does not include any modifiers. For example, when storing the raw data for a property (such as the scalar floating-point values of temperature data), the property key simply includes a property without any modifiers. When storing modified key-value pairs, the property key 350 includes modifiers identifying the type of modification performed to the raw data. For instance, when storing the rate of change along the X-axis for the temperature data, the property key includes an identification for the temperature property and an identification of the DX modifier.

In some embodiments, the property keys 350 are stored as a tuple. In this embodiment, the first elements in the tuple stores an identification of the property. The rest of the elements in the tuple stores identifications of the modifiers applied to the data identified by the first element of the tuple. The order from left to right or right to left does not matter as long as it is consistent across implementations. In some embodiments, identifiers for properties and modifiers are defined as the constant address of the global property or modifier object. In other embodiments, the property keys 350 are stored as a string, where property and modifiers are separated by delimiters (e.g., tabs, spaces, semicolons, etc.). In yet other embodiments, each property and each modifier is assigned a global static identifier such as integer or floating-point value. Identifiers may be defined during an initialization of the simulation system or added during runtime by the user.

The property may be a noun, indicating the physical quantity being represented by the simulation data associated with the property key. For example, the property may indicate that the simulation data is a: pressure, distance, volume, area, element, feature, diameter, length, angle, radius, curvature, topology, population, mass, momentum, acceleration, velocity, displacement, rotation, energy, enthalpy, entropy, charge, pressure, temperature, strain, stress, force, lift, drag, pitch, yaw, roll, altitude, attitude, color, Avogadro, Boltzmann, sound, light, heat, thermal, time, traction, population, probability, path, viscosity, frequency, electron, neutron, proton, photon, graviton, hydrogen, helium, lithium, beryllium, boron, carbon, nitrogen, oxygen, fluorine, neon, sodium, magnesium, aluminum, titanium, silicon, air, water, hydroxyl, hydronium, nitric, nitrous, carboxyl, methyl, methane, methanol, ethyl, ethane, ethene, ethyne, ethanol, and any useful quantifiable parameter or conserved molecular, atomic, and chemical cation that can be transported through space and time.

The modifier may be an adjective, noun, or verb, indicating operations that were previously applied to some related quantity. For example, the modifiers may indicate that the simulation is the value of the physical quantity, a residual value of the physical quantity, a gradient of the physical quantity, a rate of change of the physical quantity, a mean of the physical quantity, a maximum value of the physical quantity, a minimum value of the physical quantity, and the like. Other modifiers include, but are not limited to: density, maximum, minimum, mean, median, mode, deviation, root, square, rms, total, net, specific, number, count, size, exact, sum, magnitude, integral, difference, delta, flux, gradient, divergence, curl, strain, stress, ordinates t, x, y, z, derivative, rate, DT, DX, DY, DZ, convolve, filter, transform, invert, transpose, coherence, constant, coefficient, approximate, scratch, residual, limit, reference, small, large, tolerance, standard, ratio, normal, kinetic, speed, internal, molar, bulk, free, nuclear, magnetic, electric, moment, modulus, yield, ultimate, compression, tension, sheer, transfer, quality, crystalline, amorphous, solid, fiber, droplet, liquid, hydro, static, dynamic, vapor, subcritical, critical, supercritical, saturation, plasma, kinematic, formation, activation, vaporization, turbulent, compression, expansion, diffusion, dissipation, dissociation, ionization, conduction, tensor, matrix, vector, eigen, assembly, tangent, adjacency, determinant, anion, cation, hydride, oxide, peroxide, monoxide, dioxide, hydroxide, carboxide, and other physical state or mathematical operation descriptors. More concrete examples could include {pressure} and {pressure, gradient}, or {position} and {position, DT} to indicate derivatives and the like. Concatenation of multiple modifiers can track dataset operations in a semi-unique property "key-chain".

Figure 4A:
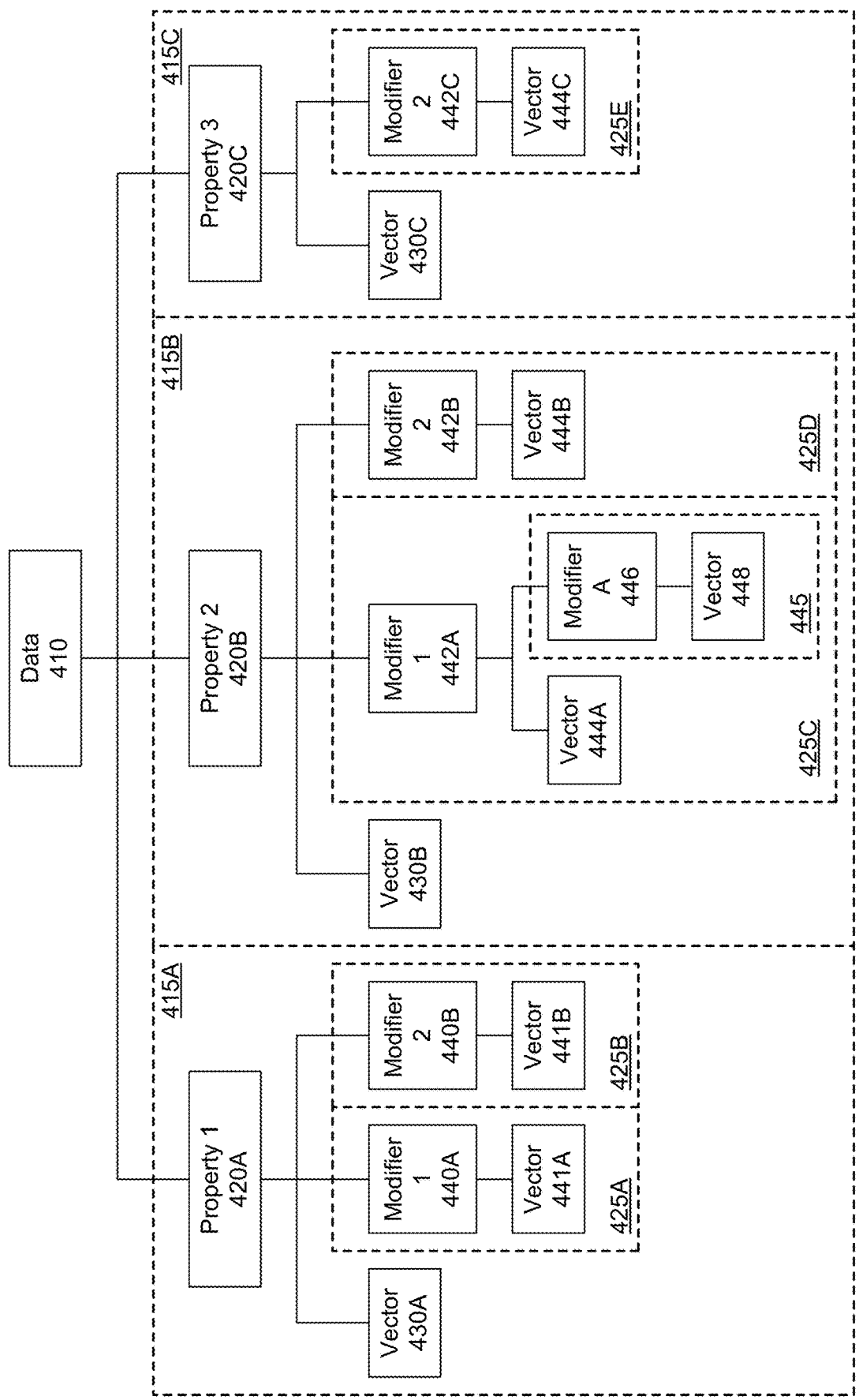
FIG. 4A illustrates an example diagram of the organization of simulation data stored by a simulation system, according to one embodiment.

FIG. 4A illustrates an example diagram of the organization of simulation data stored by a simulation system, according to one embodiment. The example data map 410 includes mappings corresponding to three properties 420A through 420C. For the first property 420A, the data map 410 includes mappings for two modifiers 440A and 440B. That is, the data map 410 includes a mapping 430A for a property key for property 1 420A, a mapping 441A for a property key for property 1 420A modified by modifier 1 440A, and a mapping 441B for a property key for property 1 420A modified by modifier 2 440B.

For the second property 420B, the data map 410 includes mappings for two modifiers 442A and 442B. For the first modifier 442A, the data map 410 further includes a mapping for data modified by an additional modifier 446. That is, the data map 410 includes a mapping 430B for a property key for property 2 420B, a mapping 444A for a property key for property 2 420B modified by modifier 1 442A, a mapping 448 for a property key for property 2 420B modified by modifier 1 and further modified by modifier A 446, and a mapping 444B for a property key for property 2 420B modified by modifier 2 442B.

For the third property 420C, the data map 410 includes a mapping 430C for a property key for property 3 420C, and a mapping 444C for a property key for property 3 420C modified by modifier 2 442C.

In some embodiments, the data map 410 is divided into subsets. For example, the data map 410 of FIG. 4A may include a first set 415A corresponding to the property keys associated with the first property 420A, a second set 415B corresponding to the property keys associated with the second property 420B, and a third set 415C corresponding to the property keys associated with the third property 420C. The first set 415A in addition includes a subset 425A corresponding to property keys associated with property 1 420A and modifier 1 440A, and a subset 425B corresponding to property keys associated with the property 1 20A and modifier 2 440B. The second set 415B includes a subset 425C corresponding to property keys associated with property 2 420B and modifier 1 442A, and a subset 425D corresponding to property keys associated with property 2 420B and modifier 2 442B. The subset 425C of the second set 415B includes a subset 445 corresponding to property keys associated with property 2 420B, modifier 1 442A and modifier A 446. The third set 415C includes a subset 425E corresponding to property keys associated with property 3 420C and modifier 2 442C.

Figure 4B:
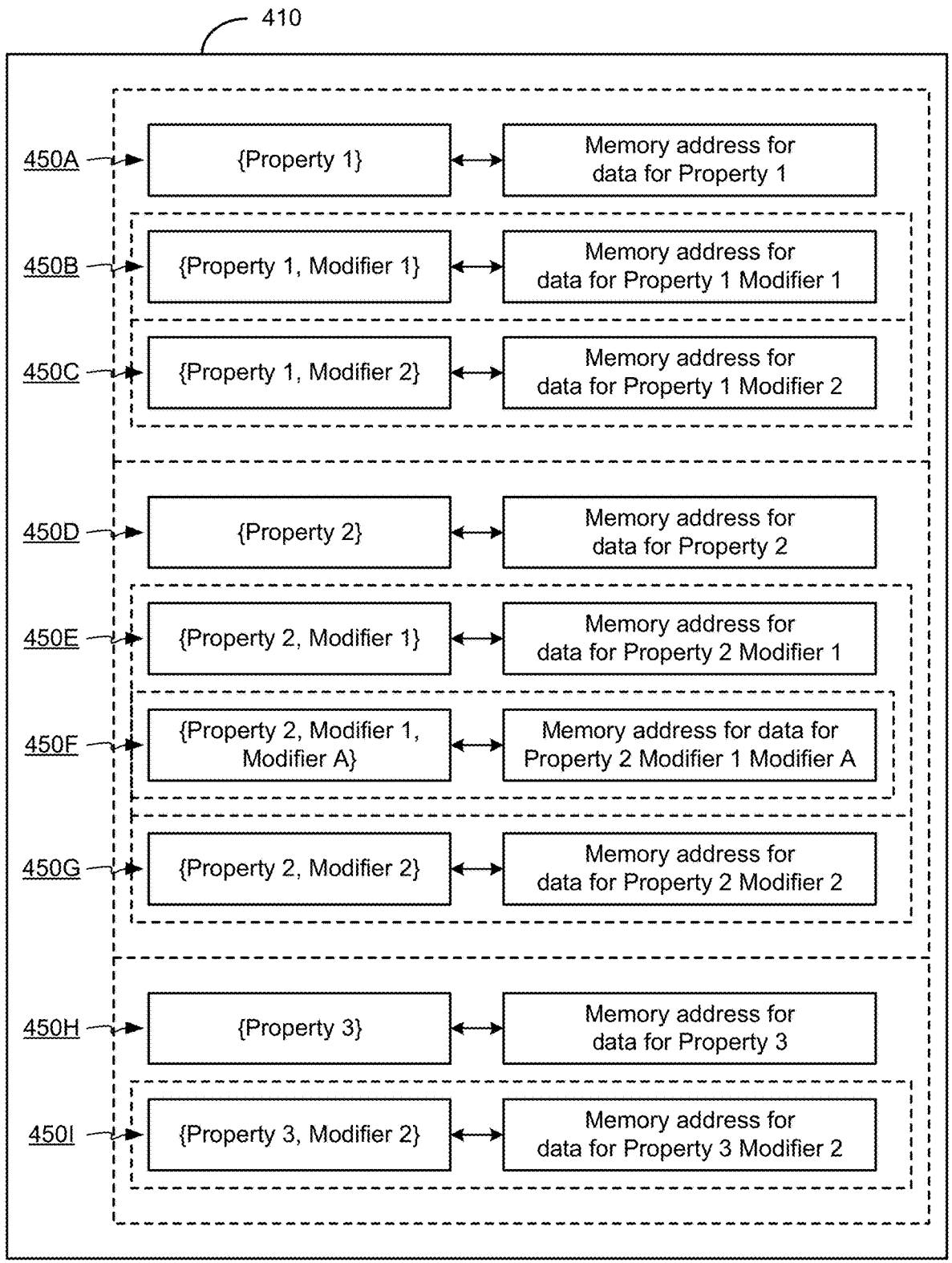
FIG. 4B illustrates an example map between property keys and memory addresses of simulation data stored by a simulation system, according to one embodiment.

FIG. 4B illustrates an example map between property keys and memory stored by a simulation system, according to one embodiment. The map 410 of FIG. 4B includes nine entries 450A through 450I. The entries 450 in the map 410 are ordered based on the property keys 350 of each entry. In particular, the entries 450 in the map 410 first orders based on the property 360 associated with the property keys 350. That is, the entries in the map 410 are ordered such that the entries with property keys associated with property 1 420A are before the entries with property keys associated with property 2 420B, and the entries with property keys associated with property 2 420B are before the entries with property keys associated with property 3 420C.

In the example of FIG. 4B, the entries with property keys associated with property 1 420A are in a first set 415A, the entries with property keys associated with property 2 420B are in a second set 415B, and the entries with property keys associated with property 3 420C are in a third set 415C. Within each set, the entries 450 are orders based on the first modifier 370A associated with each of the property keys 350. That is, within the first set 415A, the entries are ordered such that the entries having a property key associated with modifier 1 440A are before the entries having a property key associated with modifier 2 440B. Moreover, the entries are ordered such that the entry corresponding to the identifiers of property 1 are located first within the set 415A. Similarly, within the second set 415B, the entries are ordered such that the entries having a property key associated with modifier 1 442A are before the entries having a property key associated with modifier 2 442B. Furthermore, within each subset that includes entries 450 having property keys 350 associated with the same property 360 and first modifier 370A, the entries are arranged based on the second modifier 370B associated with each of the property keys 350.

In some embodiments, the map 410 further stores revision information for each of the entries. The revision information allows concurrency between asynchronous data. That is, the revision information allows for the data stored in the processor memory space and the data stored in the co-processor memory space to be synchronized. The revision information may include a major (deep) revision integer that keeps track of memory reallocation and update to values, and a minor (shallow) revision integer that can synchronize outdated values data entries based on simple comparison between two revisions.

Simulation Data Storage and Access Scheme

Figure 5:
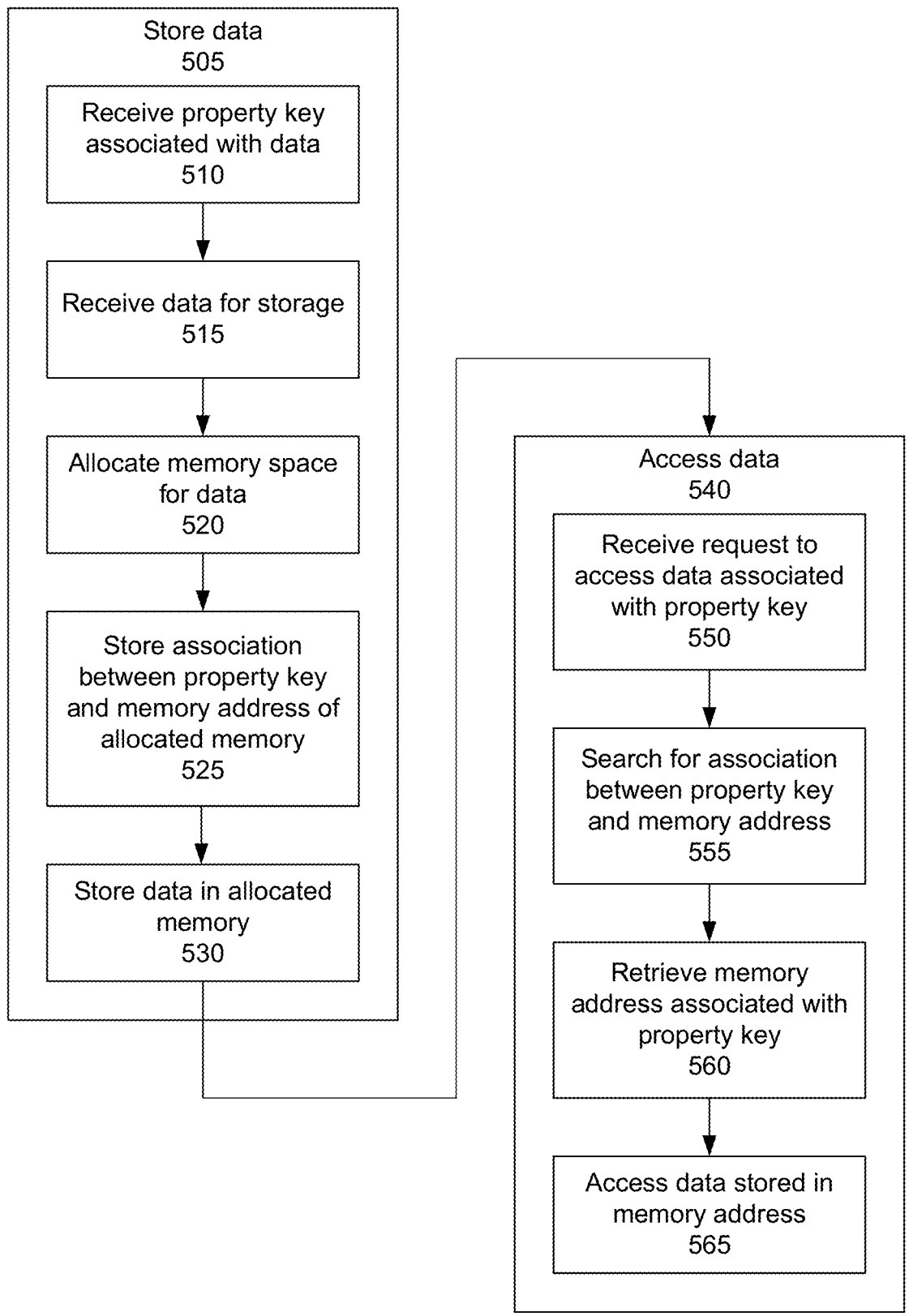
FIG. 5 illustrates a flow diagram of a method for storing and accessing simulation data stored, according to one embodiment.

FIG. 5 illustrates a flow diagram of a method for storing and accessing simulation data stored, according to one embodiment.

To store 505 simulation data, the simulation system receives 510 a property key 350 associated with simulation data to be stored. The simulation system also receives 515 the simulation data to be stored. The simulation system then allocates 520 memory for storing the received simulation data. In some embodiments, the simulation system requests the operating system of a computing device to allocated memory. In these embodiments, the simulation system receives a container or memory address to the allocated memory.

The simulation system then stores 525 an association between the received property key 350 and the container or memory address of the allocated memory. The association is stored in an associative map like the one shown in FIG. 4B. The association is stored in the associative map in a manner that results in the associative map to be lexicographically ordered based on the elements of each of the property keys. That is, the associations stored in the associative map are ordered first based on the properties 350 and then based on each modifier 370.

The simulation system stores 530 the received simulation data in the allocated memory space. In some embodiments, the memory space is a contiguous central processing unit (e.g., CPU or similar) memory. In other embodiments, the memory space is a contiguous co-processor (e.g., GPU or similar) memory. In yet other embodiments, the memory space is a shared memory space. Moreover, the simulation system includes functions to synchronize the data stored in the processor and co-processor memory space to enable data concurrency to take place.

To access 540 simulation data, the simulation system receives 550 a request to access data associated with a property key 530. The simulation system searches 555 for an association between a given property key and entries the associative map 310. A detailed description of how to search for the association between a property key and a database entry is provided in conjunction with FIGS. 6A and 8A. If desired, pointers and references to properties and modifiers can be dereferenced to access assigned intrinsic property and modifier attributes including: dimensional unit exponents and serialized form (e.g. name). Such attributes can be agglomerated and/or used to check for physical compatibility between datasets and operations.

The simulation system then retrieves 560 the entry associated with the property key from the associative map 310, and access 565 the stored data in memory. In some embodiments, the memory address is retrieved as a container or pointer to the memory space allocated for storing the simulation data associated with the property key. In some embodiments, depending on whether a processor or a co-processor is requesting the simulation data, a different memory address or pointer is retrieved. That is, if a processor is requesting the simulation data, a pointer specific to the processor memory is retrieved. Conversely, if a co-processor is requesting the simulation data, a pointer specific to the co-processor memory is retrieved.

Figure 6A:
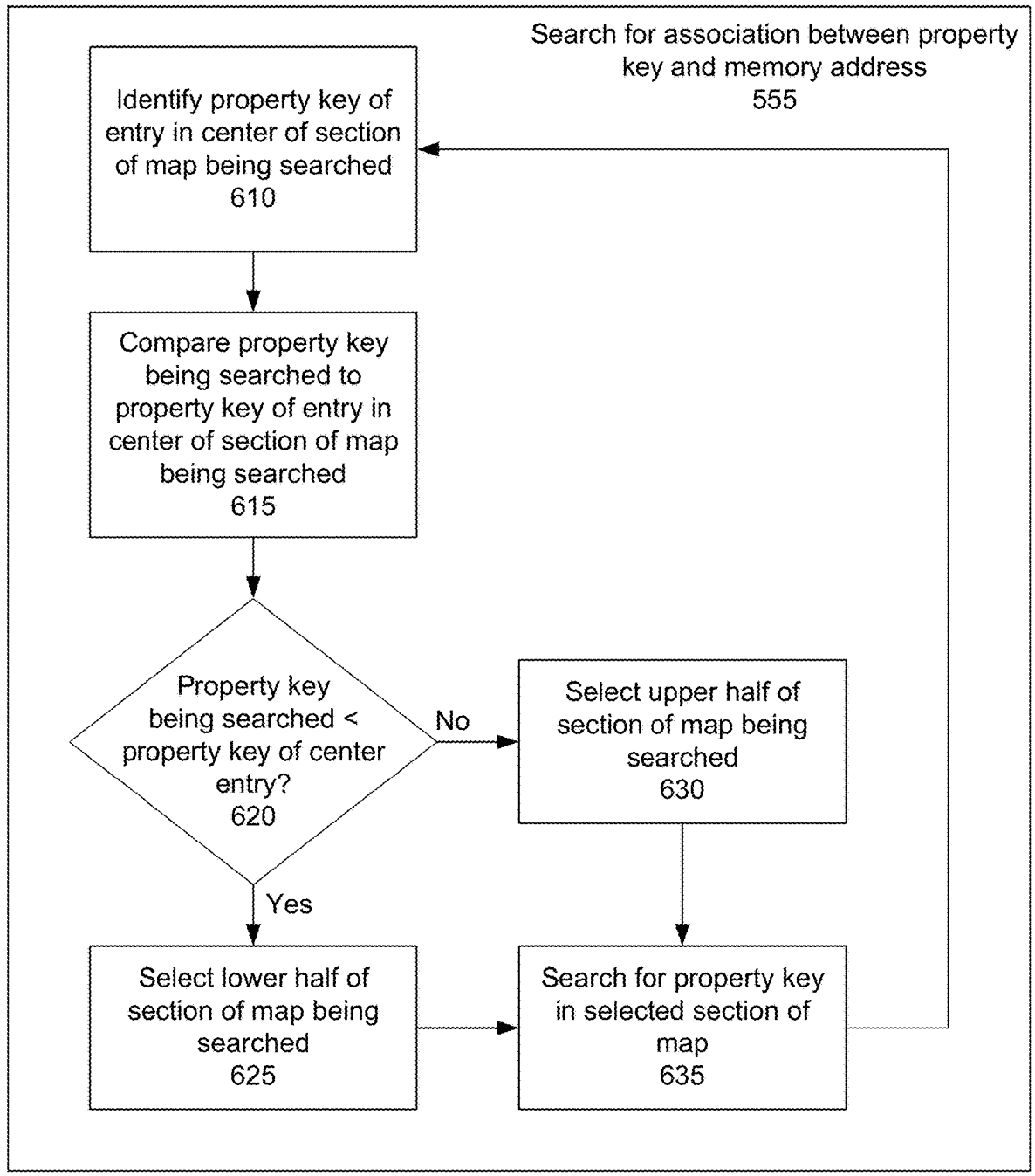
FIG. 6A illustrates a flow diagram of a method for searching for an association between a property key and a memory address of simulation data stored in a memory of a simulation system, according to one embodiment.

FIG. 6A illustrates a flow diagram of a method for searching for an association between a property key and a simulation data entry, according to one embodiment.

The simulation system identifies 610 a property key of the entry in the middle of the map 310 being searched. At the beginning of the search, the portion of the map being searched is the entirety of the map. That is, at the beginning of the search, the entry in the middle of the map 310 is identified. The property key being searched is compared to the test entry in the middle of the associative map 310.

In some embodiments, the comparison between the property key being searched and the property key of the test entry in the middle of the map 310 being searched (test entry) determines 620 whether the property key being searched is "less than" the property key of the test entry. If the property key being searched is less than the property key of the test entry, the lower half of the section of the map being searched is selected 625. If the property key being searched is not less than the property key of the test entry, the upper half of section of the map being searched is selected 630.

In some embodiments, the search 555 is performed using associative iterators. That is, the selections 625 of the lower half of the section of the map being searched and the selection 630 of the upper half section of the map being search is performed using the iterators. At the beginning of the search, a first iterator points to the first entry of the map 310 and a second iterator points to the last entry of the map 310. The test entry is then selected to be the entry in the middle of the range between the first and second iterators. After the comparison between the property key being searched and the property key of the test entry is performed, either the first iterator or the second iterator is moved. If the property key being searched is less than the property key of the test entry, the second iterator is moved to point to the test entry. In some embodiments, the first iterator is moved to point to the entry right before the test entry. If the property key being searched is not less than the property key of the test entry, the first iterator is moved to point to the test entry. In some embodiments, the second iterator is moved to point to the entry right after the test entry.

The simulation system then searches 635 the property key in the selected section of the map. That is, steps 610 through 635 are repeated using the selected section of the map until the property key has been found.

In some embodiments, a determination of whether the property key being searched is the same as the property key of the test entry is made. If simulation system determines that the property key being searched is the same as the property key of the test entry, the process ends and it returns the mapping between the test entry and the memory address associated with the test entry.

In one embodiments, property keys have a "equal to" or "==" function to determine whether a first property key and a second property key are equal or the same. That is, the property keys have separate "equal to" (==) and "less than" (<) functions. Property keys may further have a larger than (>) function. In this embodiment, the "equal to" function returns true if all properties and modifiers are equal and in the order. In other embodiments, the property keys have a "compare" function that returns a first value (e.g., −1) if the first property key is less than the second property key, a second value (e.g., 0) if the first property key and the second property key are equal, and a third value (e.g., 1) if the first property key is not less than and not equal to the second property key. That is, the "compare" function returns the third value if the first property key is larger than the second property key. When searching for a property key in a map, based on the value of the "compare" function, the simulation system may perform one of three operations. If the "compare" function returns the first value (e.g., −1), the simulation system selects the lower half of the section of the map being searched. If the "compare" function returns the third value (e.g., 1), the simulation system selects the upper half of the section of the map being searched. If the "compare" function returns the second value (e.g., 0), the simulation system returns the mapping between the second property key used in the "compare" function and the memory address associated with the second property key.

Figure 6B:
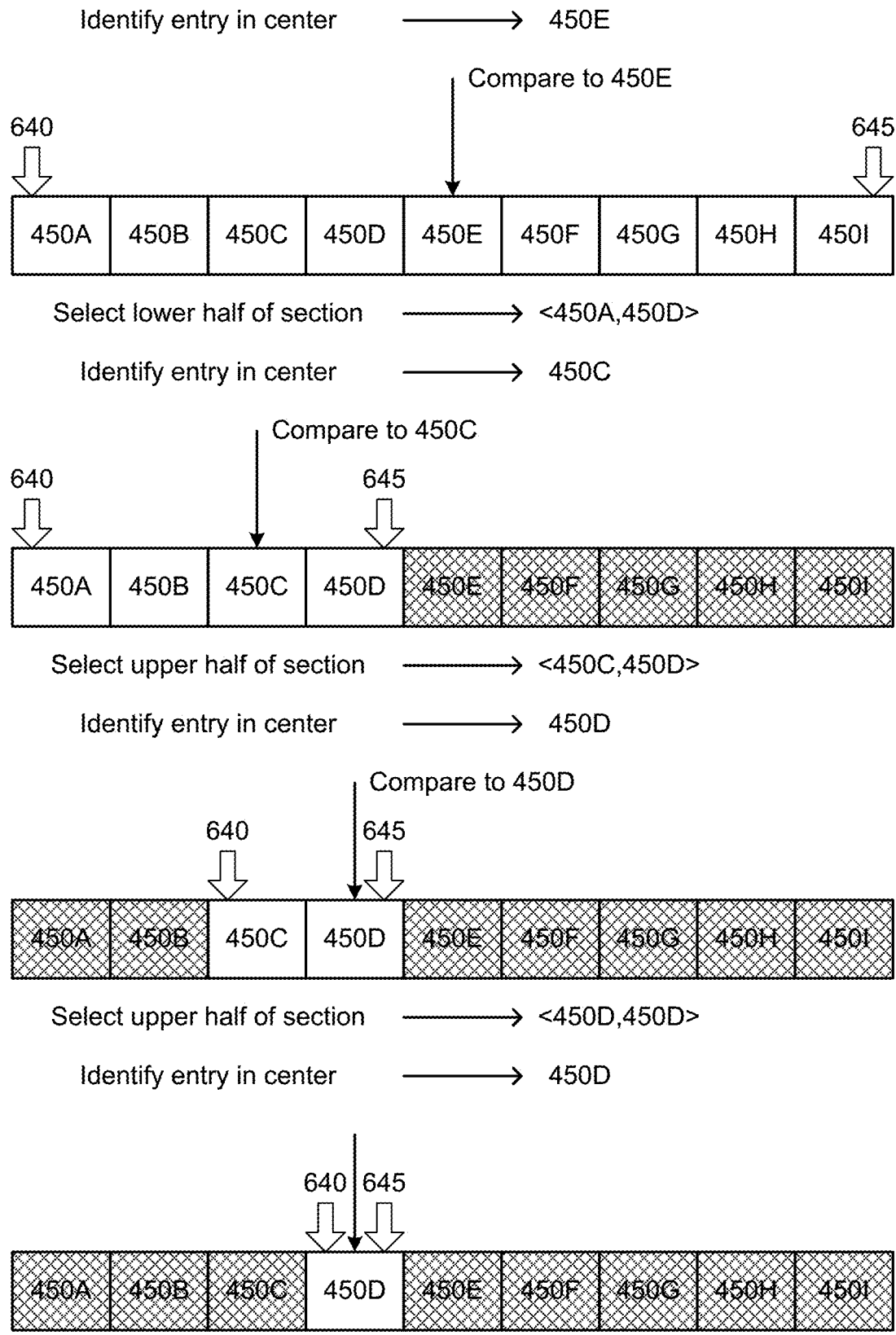
FIG. 6B illustrates an example using the map of FIG. 4B.

FIG. 6B illustrates an example using the map 410 of FIG. 4B. In the example of FIG. 6B, the property key being search matches the property key of entry 450D. First, the test entry is identified. In the example of FIG. 6B, the test entry is entry 450E. If iterators are used, at this iteration stage, the first iterator 640 points to entry 450A and the second iterator 645 points to entry 450I. The property key being searched is compared to the property key of the test entry 450E. In this example, the property key being searched is less than the property key of entry 450E. Thus, the lower half of the map 410 is selected. That is, the second iterator 645 is moved to point to entry 450D. The lower half of the map 410 includes entries 450A through 450D.

The test entry in the section being considered (450A through 450D) is identified. In this example, the test entry is entry 450C. The property key being searched is then compared to the property key of entry 450C. In this example, the property key being searched is not less than the property key of entry 450C. Thus, the upper half of the section is selected. That is, the first iterator 640 is moved to point to entry 450C. The upper half of the section being searched includes entries 450C through 450D.

Subsequently, the test entry in the section being considered (450C through 450D) is identified. In this example, the test entry is entry 450D. The property key being searched is then compared to the property key of entry 450D. In this example, the property key being searched is not less than the property key of entry 450D. Thus, the upper half of the section is selected. That is, the first iterator 640 is moved to point to entry 450D. The upper half of the section being searched includes only entry 450D.

In some embodiments, if the simulation system compares the property key being searched to the property key of the middle entry (relative to the search-space), the process would end when the simulation system compares the property key being searched with entry 450D for the first time. In other embodiments, the process continues until the search-space includes only one entry. That is, when the first and second iterators point to the same entry. In yet other embodiments, the process continues until the search-space includes no more than two entries. In this embodiment, the simulation system compares the property key being searched to either the entry pointed by the first iterator 640 or the entry pointed by the first iterator 645, or both. For instance, if the simulation system determines that the property key being searched is equal to the property key of the entry pointed by the first iterator 640, the entry pointed by the first iterator 640 is returned. Conversely, if the property key being searched is not equal to the property key of the entry pointed by the first iterator 640, the entry pointed by the second iterator 645 is returned. Alternatively, if the property key being searched is not equal to the property key of the entry pointed by the first iterator 640, the simulation system determines whether the property key being searched is equal to the property key of the entry pointed by the second iterator 645. If the property key being search is equal to the property key of the entry pointed by the second iterator 645, the entry pointed by the second iterator is returned. Otherwise, the simulation system determines that the property being searched is not included in the map 310.

In other embodiments, the search ends when the section of the map being searched includes only one entry. That is, when the first iterator and the second iterator point to the same entry. If a matching entry is not found, a reserved out-of-bounds iterator can be returned, such as map::end( ).

Figure 6C:
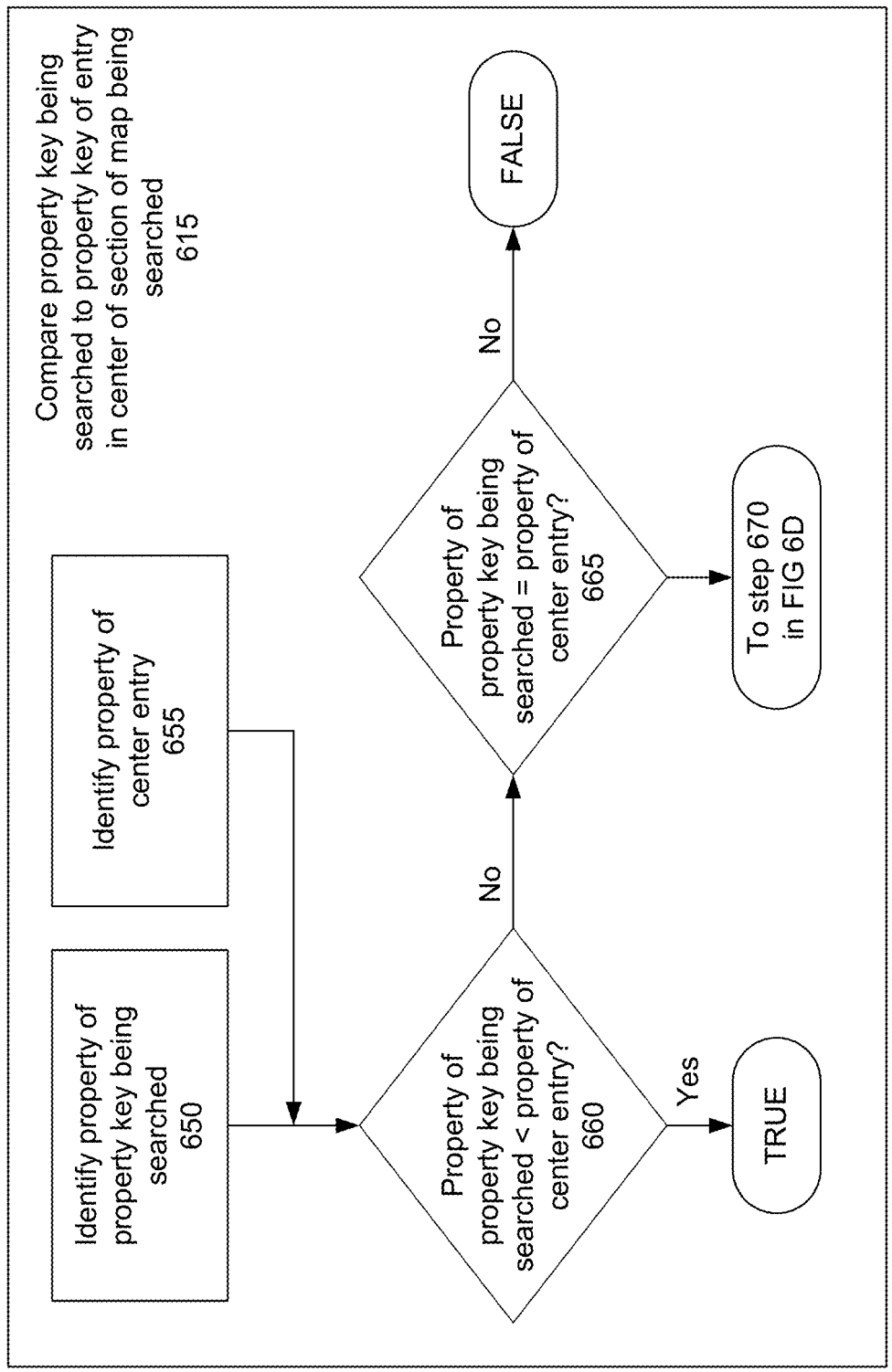
FIGS. 6C and 6D illustrate a flow diagram of a method for comparing two property keys, according to one embodiment.
Figure 6D:
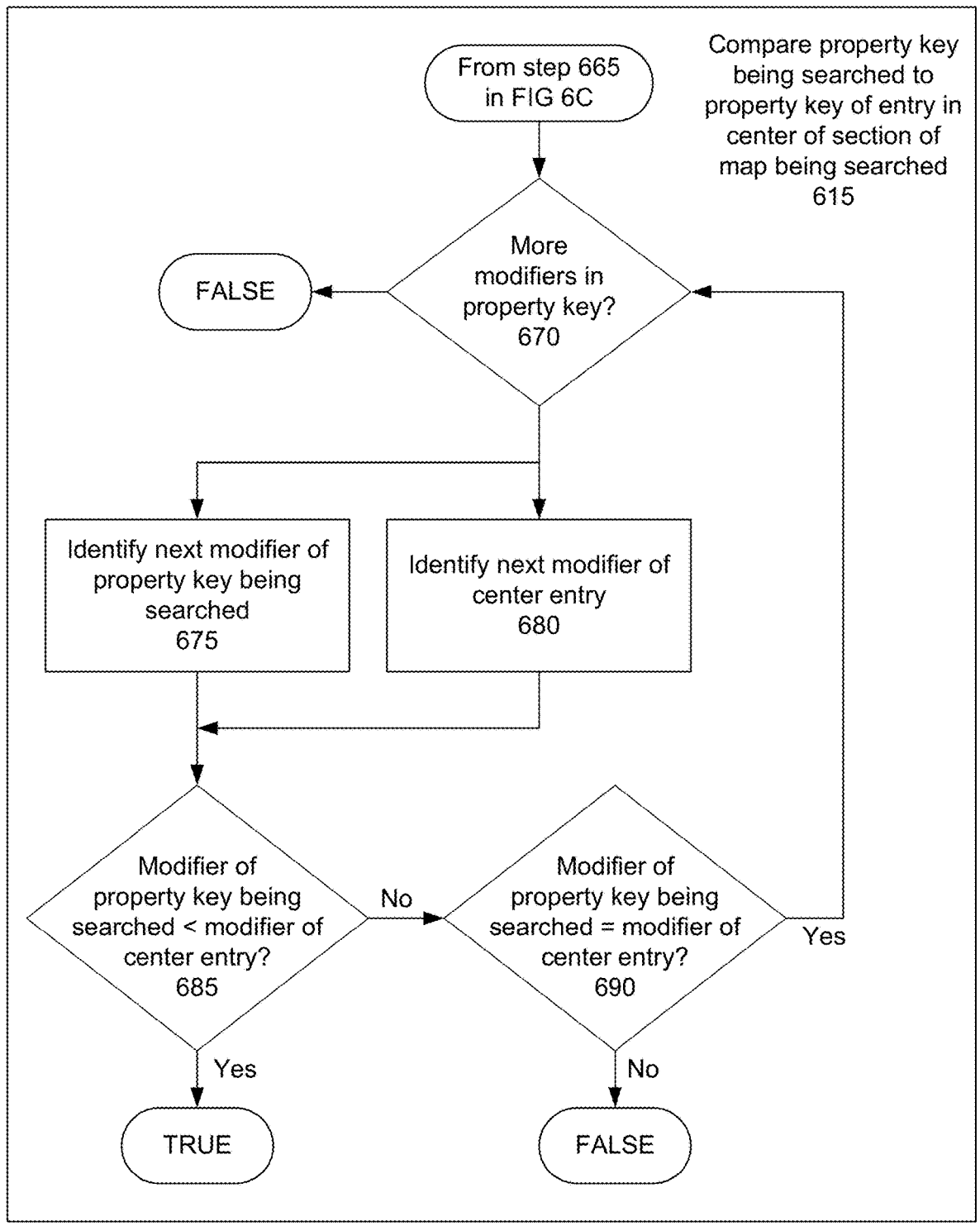

FIGS. 6C and 6D illustrate a flow diagram of a method for comparing two property keys, according to one embodiment. The simulation system identifies 650 the property of the property key being searched, and identifies 655 a property of the property key of the test entry. The property of the property key being searched is compared to the property of the property key of the test entry. If the simulation system determines 660 that the property of the property key being searches is less than the property of the property key of the test entry, the process returns TRUE. Otherwise, the simulation system determines 665 whether the property of the property key being searched is the same as the property of the property key of the test entry. If the property of the property key being searched is not the same as the property of the property key of the test entry, the process returns FALSE. Otherwise, the simulation system determines if there are modifiers in the property key being searched. If there are no modifiers in the property key being searched, the process returns FALSE.

Otherwise, if the property key being searched does contain modifiers, the simulation system identifies 675 the first modifier of the property key being searched, and identifies 680 the first modifier of the property key of the test entry. The modifier of the property key being searched is compared to the modifier of the property key of the test entry. If the simulation system determines 685 that the modifier of the property key being searched is less than the modifier of the property key of the test entry, the process returns TRUE. Otherwise, the simulation system determines 690 whether the modifier of the property key being search is the same as the modifier of the property key of the test entry. If the modifier of the property key being searched is not the same as the modifier of the property key of the test entry, the process returns FALSE. Otherwise, the simulation system determines if there are additional modifiers in the property key being searched. If there are no additional modifiers in the property key being searched, the process returns FALSE. Otherwise, the steps are repeated with the additional modifiers of the property key being searched.

For example, when comparing property key 450E ({Property 2, Modifier 1}) is compared to property key 450G ({Property 2, Modifier 2}), first the property of property key 450E is compared to the property of property key 450G. That is, "Property 2" is compared to "Property 2." Here, the property of property key 450E is not less than the property of property key 450G. Instead, the two properties are the same. Thus, a determination is made whether the property key 450E includes modifiers. In this case, property key includes a first modifier. Thus, the first modifier of property key 450E is compared to the first modifier of property key 450G. That is, "Modifier 1" is compared to "Modifier 2." In this case, "Modifier 1" is less than "Modifier 2." Thus, the process returns TRUE.

Figure 7:
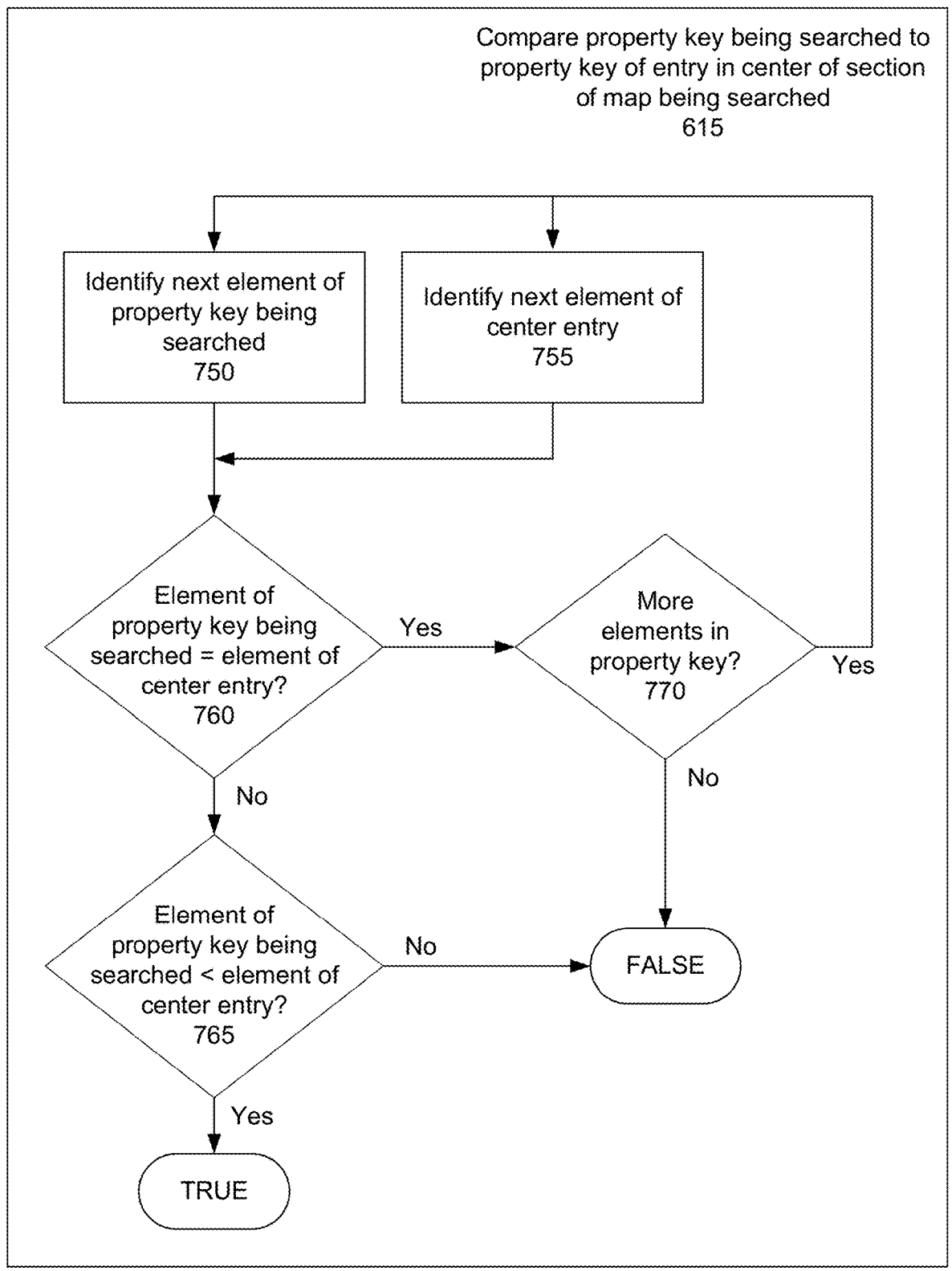
FIG. 7 illustrate a flow diagram of a method for comparing two property keys, according to another embodiment.

FIG. 7 illustrate a flow diagram of a method for comparing two property keys, according to another embodiment. The simulation system identifies 750 the first element of the property key being searched, and identifies 755 the first element of the property key of the test entry. In some embodiments, the first element of a property key is the property associated with the property key. The first element of the property key being searched is compared to the first element of the property key of the test entry. If the simulation system determines 760 that the first element of the property key being searched is not the same as the first element of the property key of the test entry, the simulation system determines 765 whether the first element of the property key being searched is less than the first element of the property key of the test entry. If the first element of the property key being searched is less than the first element of the property key of the test entry, the process returns TRUE. Otherwise, the first element of the property key being searched is not less than the first element of the property key of the test entry, the process returns FALSE.

Conversely, if the simulation system determines 760 that the first element of the property key being searched is the same as the first element of the property key of the test entry, the simulation system determines 770 whether the property key being searched includes additional elements. That is, the simulation system determines whether the property key being searched includes modifiers that have not yet been considered. If the property key being searched does not include additional elements, the process returns FALSE. Otherwise, if the property key being searched does include additional elements, the simulation system identifies 750 the next element in the property key being searched, and identifies 755 the next element in the property key of the test entry. The steps are then repeated with the following key elements. That is, the steps 760 through 770 are repeated with the second element of the property keys (i.e., first modifier), the third element of the property keys (i.e., second modifier), and so on until either all the elements of the property key being searched has been considered, or until the process returns a value.

For example, when comparing property key 450E ({Property 2, Modifier 1}) is compared to property key 450G ({Property 2, Modifier 2}), first the first element (i.e., property) of property key 450E is compared to the first element (i.e., property) of property key 450G. That is, "Property 2" is compared to "Property 2." Here, the two properties are the same. Thus, a determination is made whether the property key 450E includes additional key elements. In this case, property key includes a first modifier. Thus, the second element (i.e., first modifier) of property key 450E is compared to the second element (i.e., first modifier) of property key 450G. That is, "Modifier 1" is compared to "Modifier 2." Here the two properties are not the same. Thus, a determination is made whether "Modifier 1" is less than "Modifier 2." In this case, "Modifier 1" is less than "Modifier 2." Thus, the process returns TRUE.

Figure 8A:
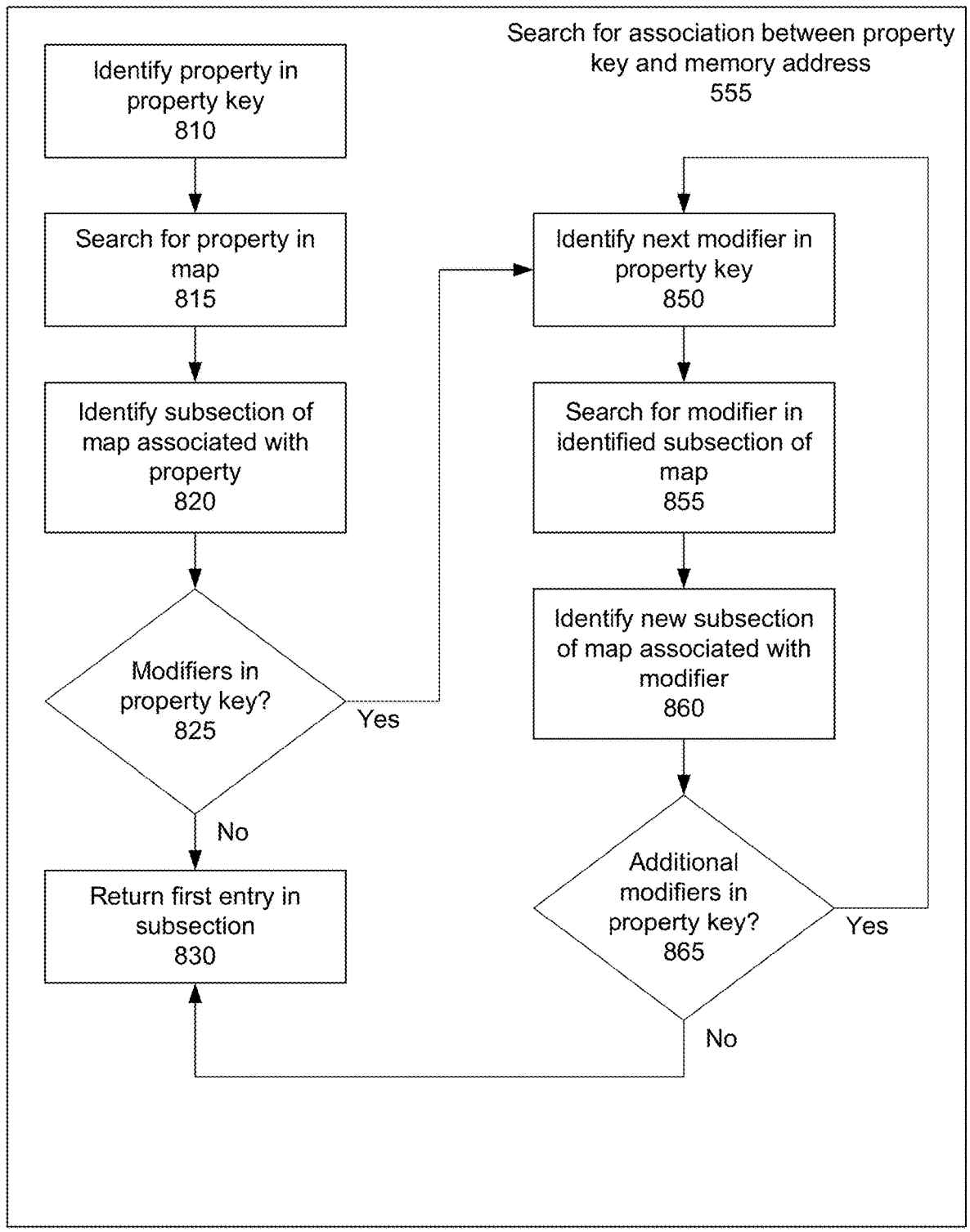
FIG. 8A illustrates a flow diagram of a method for searching for an association between a property key and a memory address of simulation data stored in a memory of a simulation system, according to another embodiment.

FIG. 8A illustrates a flow diagram of a method for searching for an association between a property key and simulation data stored in a memory of a simulation system, according to another embodiment.

The simulation system identifies 810 the property in the property key being searched, and searches 815 for the property in the map 310. A detailed description of the process for searching for the property in the map 310 is provided in conjunction with FIG. 8B. Once the property has been found in the map 310, a subset of the map having entries associated with the property is identified 820.

The simulation system then determines 825 whether the property key being searched includes modifiers. If the property key being searched does not include modifiers, the first entry in the set is returned 830. Otherwise, the next modifier in the property key being searched is identified 850. The identified modifier is then searched 855 in the identified subset of the map. The process for searching for a modifier in a subset of the map is provided in conjunction with FIG. 8C. Once the modifier has been found in the subset of the map 310, a new subset of the map having entries associated with the modifier is identified 860.

The simulation system then determines 865 whether the property key being searched includes additional modifiers. If the property key being searched does not include additional modifiers, the first entry in the set is returned 830. Otherwise, the next modifier in the property key being searched is identified 850, and steps 855 through 865 are repeated with the newly identified modifier.

Figure 8B:
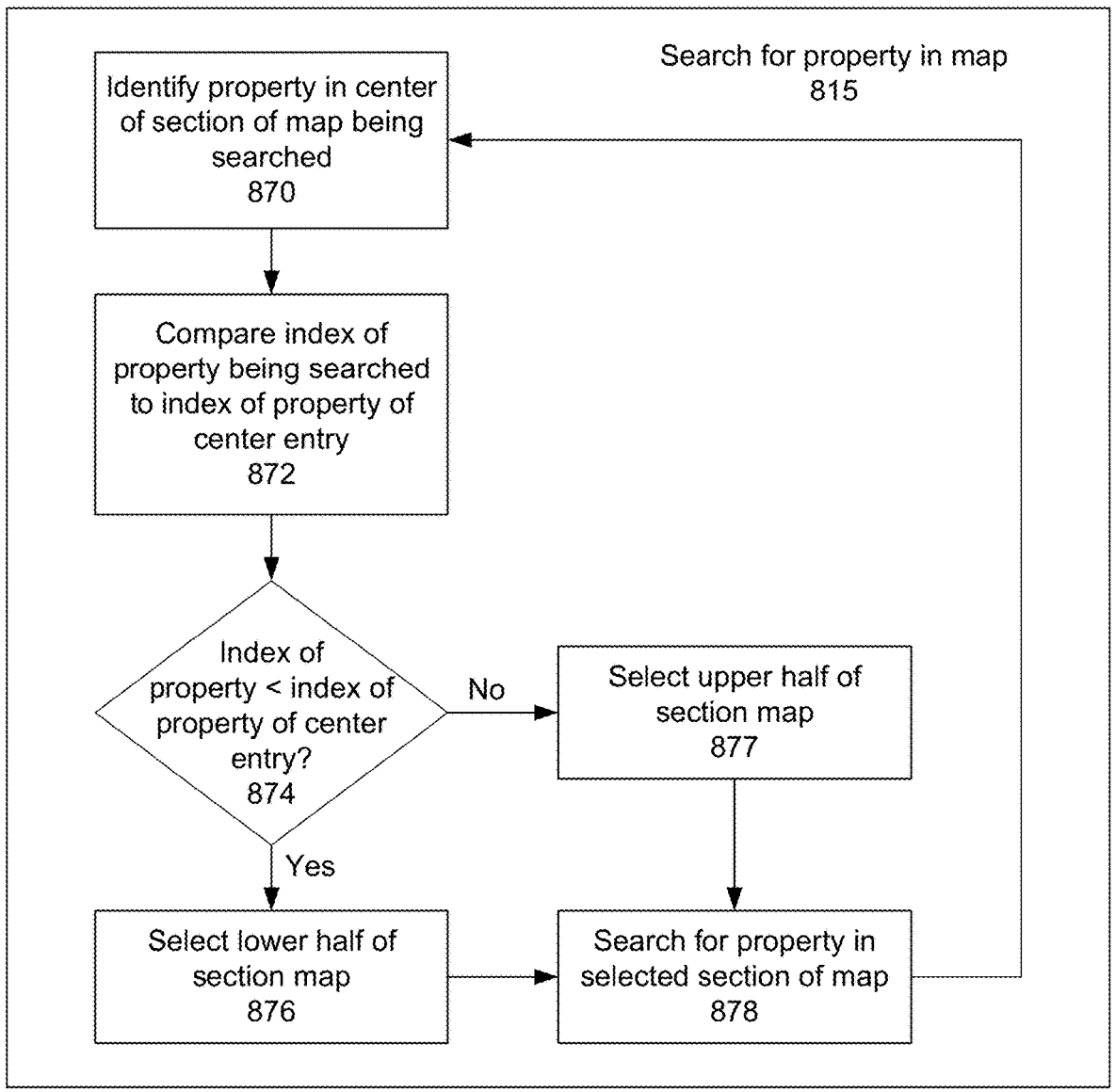
FIG. 8B illustrates a flow diagram of a method for searching for a property in a map, according to one embodiment.

FIG. 8B illustrates a flow diagram of a method for searching for a property in a map, according to one embodiment. The simulation system identifies 870 a property of the entry in the middle portion of the map 310 being searched. At the beginning of the search, the initial set is the entirety of the map. That is, at the beginning of the search, the property of the entry in the middle of the map 310 is identified. The property of the property key being searched is compared 872 to the property of the test entry in the middle of the associative map 310.

If the property of the property key being searched is less than the property of the property key of the test entry, the lower half of the map being searched is selected 876. If the property key being searched is not less than the property key of the test entry, the upper half of the map being searched is selected 877.

The simulation system then searches 878 the property in the selected portion of the map. That is, steps 870 through 878 are repeated using subsets of the map until the property has been found or ruled out.

Figure 8C:
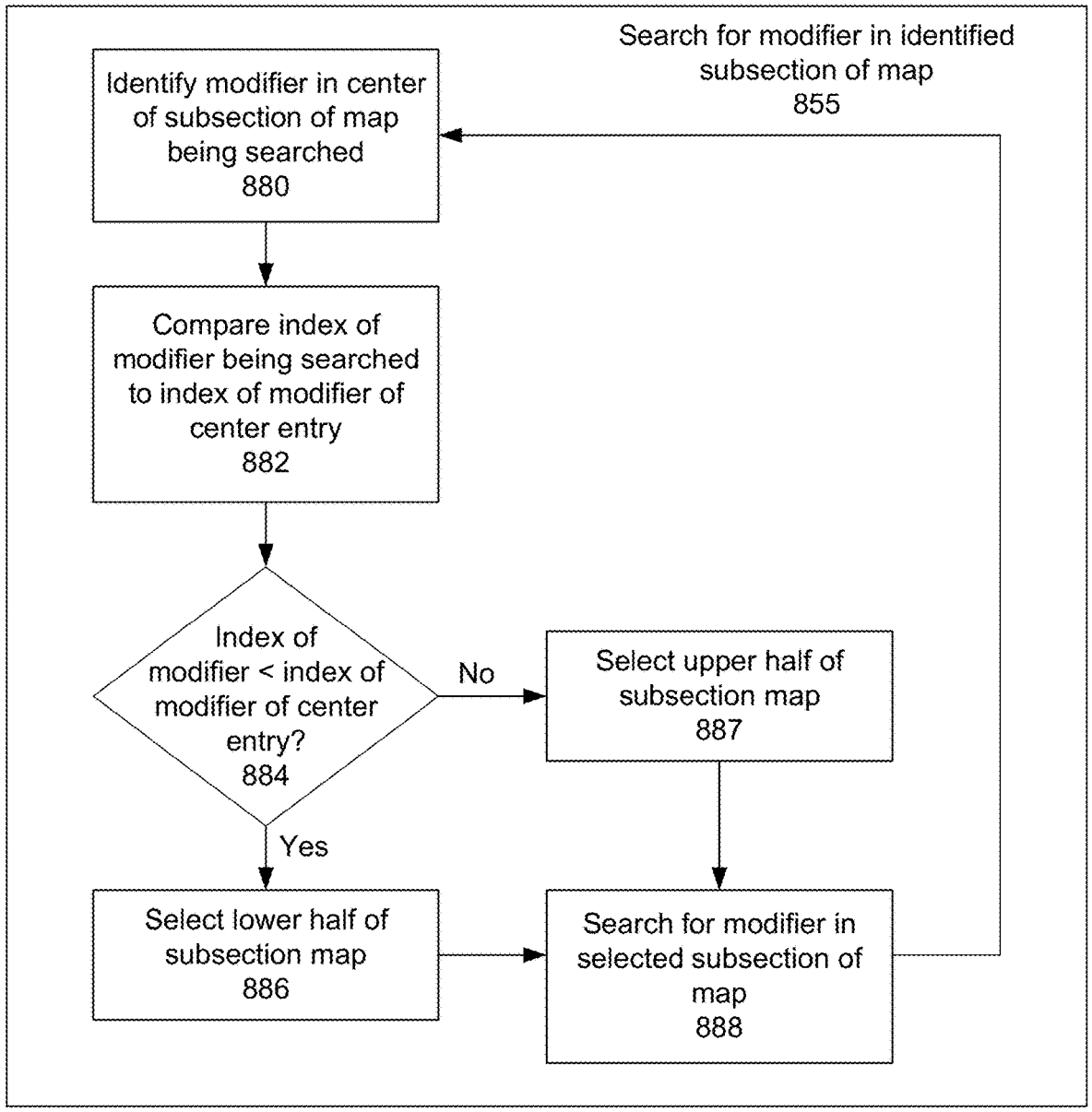
FIG. 8C illustrates a flow diagram of a method for searching for a modifier in an identified subset of the map, according to one embodiment.

FIG. 8C illustrates a flow diagram of a method for searching for a modifier in an identified subset of the map, according to one embodiment. The simulation system identifies 880 a modifier of the test entry of the portion of the map 310 being searched. The modifier being searched is compared 882 to the modifier of the test entry in the middle of the subset of the map.

If the modifier being searched is less than the modifier of the middle test entry, the lower half of the set being searched is selected 886. If the modifier searched is not less than the modifier of the test element, the upper half set of the map being searched is selected 887.

The simulation system then searches 888 the modifier in the selected subset of the map. That is, steps 880 through 888 are repeated using the selected subspace of the map until the modifier has been found.

In some embodiments, the comparison between properties or modifiers is performed based on a predefined or intrinsic ordering of properties and modifiers. In one embodiment, upon construction during initialization or user runtime definition, each property and each modifier is assigned a unique global static number identifier. In some embodiments, this can simply be the address of the object. When comparing whether a first property is "less than" a second property, the global statically defined identifier of the first and second properties are compared. Similarly, when comparing whether a first modifier is "less than" a second modifier, the global statically defined identifiers of the first and second modifiers are compared.

In some embodiments, the simulation system performs a string comparison between an element of a property key provided by a user, and the strings of the statically defined strings corresponding to each of the properties or modifiers that are available in the simulation system. Strings are sorted and compared with similar lexicographical logic, through may use more operations to check each character. A literal format is useful for serialization and deserialization of databases for wire or file formats, providing compatibility across sessions and machine architectures. Compatibility across simulation systems requires consistent naming conventions. Properties and Modifiers can be deserialized by the simulation system using a map between name and object. In other embodiments, the simulation system performs a hashing function to convert a string into a unique index identifier for a property or modifier corresponding to the string and perform similar logic. In yet other embodiments, the user of the simulation system identifies the properties and modifiers by assigned compare-able identifier.

FIG. 9 illustrates a flow diagram of an example algorithm using the data access disclosed herein. The example algorithm first checks 910 if the map 310 includes a property key provided to the function. If the map does not include the property key, then the function ends. In some embodiments, the function performs an error handling procedure if the map does not include the property key.

The example algorithm then accesses 930 the simulation data using the memory address associated with the property key in map 310. In some embodiments, the sample algorithm may append 920 modifiers to the property key and accesses 930 the simulation data associated with the modified property key.

After the simulation data has been retrieved from memory, a computation is performed 940 using the retrieved simulation data, and the result of the computation is stored 950 into memory.

Computing Machine Architecture

Figure 10:
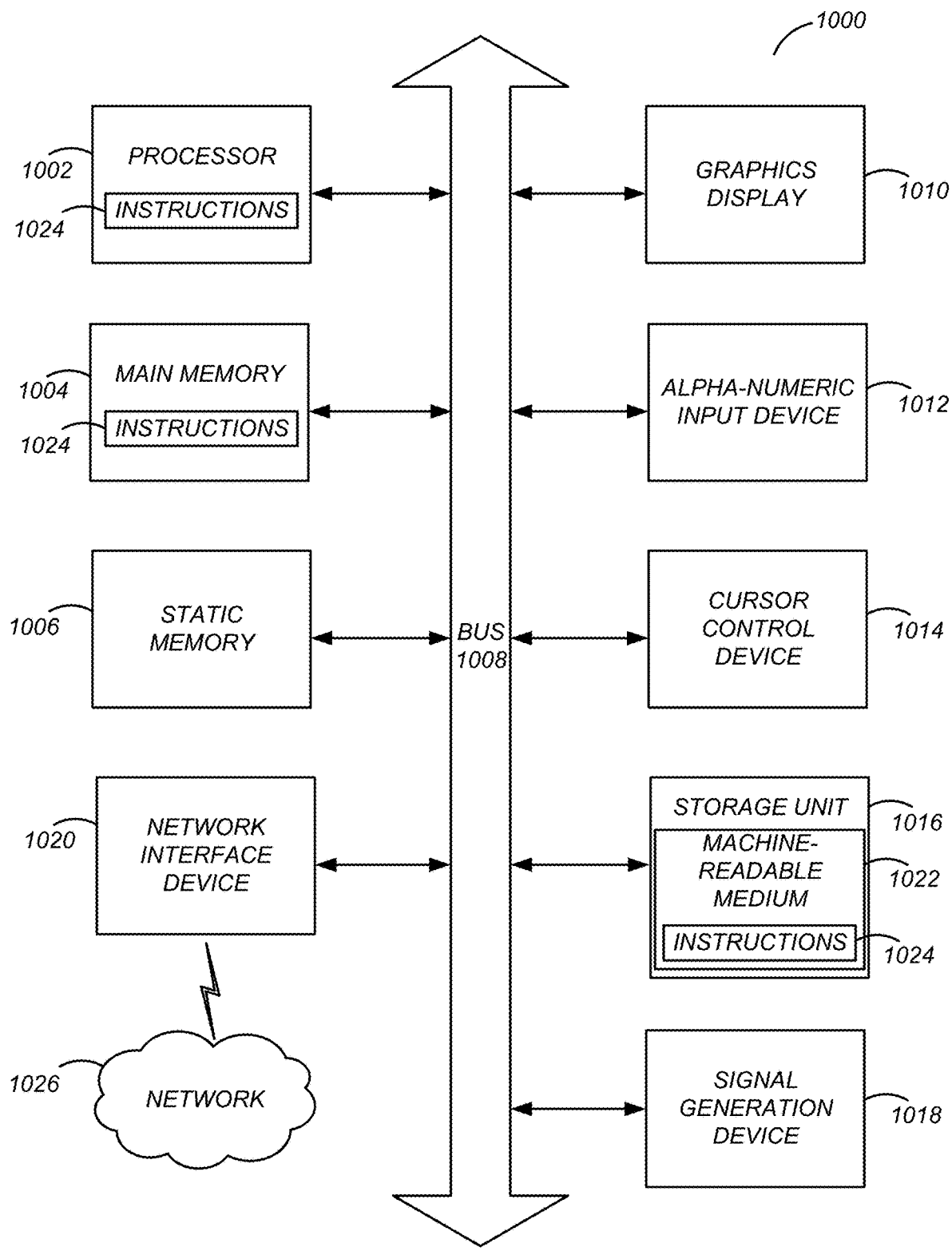
FIG. 10 illustrates a block diagram illustrating components of an example machine able to read instructions from a machine-readable medium and execute them in a processor (or controller).

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A method comprising:
receiving a request to retrieve simulation data from a memory of a computing system, the request including a property key identifying the simulation data to be retrieved;
searching the property key in a map, the map storing associations between a plurality of property keys and memory where simulation data associated with a corresponding property key is stored, wherein searching the property key in the map comprises:
identifying a middle test entry in the map;
comparing the property key of the request to a property key of the middle test entry; and
selecting a subset of the map based on the comparison, comprising:
responsive to determining that the property key of the request is less than the property key of the middle test entry in a predefined lexicographical order, selecting a lower half of the map; and
responsive to determining that the property key of the request is not less than the property key of the middle test entry in the predefined lexicographical order, selecting an upper half of the map;
retrieving the memory for the requested simulation data; and
accessing the retrieved memory to obtain the requested simulation data.

2. The method of claim 1, wherein the property key includes a property identifier and one or more modifier identifiers.

3. The method of claim 1, wherein the memory is retrieved as a container or pointer to the portion of memory where the requested simulation data is stored.

4. The method of claim 1, wherein comparing the property key of the request to a property key of the middle test entry comprises:
identifying a first element of the property key of the request;
identifying a first element of the property key of the middle test entry; and
comparing the first element of the property key of the request to the first element of the property key of the middle test entry.

5. The method of claim 4, wherein comparing the property key of the request to a property key of the middle test entry further comprises:
responsive to determining that the first element of the property key of the request is the same as the first element of the property key of the middle test entry:
determining whether the property key of the request includes additional elements;
responsive to determining that the property key of the request includes additional elements:
identifying a next element of the property key of the request,
identifying a next element of the property key of the middle test entry, and
comparing the next element of the property key of the request to the next element of the property key of the middle test entry.

6. The method of claim 5, wherein the first element of the property key of the request is a property associated with the simulation data, and the next element of the property key of the request is a modifier associated with the simulation data.

7. The method of claim 4, wherein comparing the property key of the request to a property key of the middle test entry further comprises:
responsive to determining that the first element of the property key of the request is not the same as the first element of the property key of the middle test entry:
determining whether the first element of the property key of the request is less than the first element of the property key of the middle test entry.

8. The method of claim 7, wherein determining whether the first element of the property key of the request is less than the first element of the property key of the middle test entry comprises:
determining whether a predefined compare-able identifier associated with the first element of the property key of the request is less than a predefined compare-able identifier associated with the first element of the property key of the middle test entry.

9. The method of claim 4, wherein comparing the property key of the request to a property key of the middle test entry further comprises:
responsive to determining that the element of the first property key of the request is the same as the first element of the property key of the middle test entry:
determining whether the property key of the request includes additional elements; and
responsive to determining that the property key of the request does not include additional elements, determining that the property key of the request is not less than the property key of the middle test entry.

10. The method of claim 4, wherein the first element of the property key of the request describes a physical quantity associated with the simulation data identified by the property key of the request.

11. The method of claim 10, wherein the physical quantity is one of a: pressure, distance, volume, area, element, feature, diameter, length, angle, radius, curvature, topology, population, mass, momentum, acceleration, velocity, displacement, rotation, energy, enthalpy, entropy, charge, pressure, temperature, strain, stress, force, lift, drag, pitch, yaw, roll, altitude, attitude, color, Avogadro, Boltzmann, sound, light, heat, thermal, time, traction, population, probability, path, viscosity, frequency, electron, neutron, proton, photon, graviton, hydrogen, helium, lithium, beryllium, boron, carbon, nitrogen, oxygen, fluorine, neon, sodium, magnesium, aluminum, titanium, silicon, air, water, hydroxyl, hydronium, nitric, nitrous, carboxyl, methyl, methane, methanol, ethyl, ethane, ethene, ethyne, and ethanol.

12. The method of claim 9, wherein the next element of the property key of the request describes a modifier applied to the simulation data.

13. The method of claim 12, wherein the next element of the property key of the request identifies that the modifier is one of a: density, maximum, minimum, mean, median, mode, deviation, root, square, rms, total, net, specific, number, count, size, exact, sum, magnitude, integral, difference, delta, flux, gradient, divergence, curl, strain, stress, ordinates t, x, y, z, derivative, rate, DT, DX, DY, DZ, convolve, filter, transform, invert, transpose, coherence, constant, coefficient, approximate, scratch, residual, limit, reference, small, large, tolerance, standard, ratio, normal, kinetic, speed, internal, molar, bulk, free, nuclear, magnetic, electric, moment, modulus, yield, ultimate, compression, tension, sheer, transfer, quality, crystalline, amorphous, solid, fiber, droplet, liquid, hydro, static, dynamic, vapor, subcritical, critical, supercritical, saturation, plasma, kinematic, formation, activation, vaporization, turbulent, compression, expansion, diffusion, dissipation, dissociation, ionization, conduction, tensor, matrix, vector, eigen, assembly, tangent, adjacency, determinant, anion, cation, hydride, oxide, peroxide, monoxide, dioxide, hydroxide, and carboxide.

14. A non-transitory computer-readable storage medium configured to store instructions, the instructions when executed by a processor cause the processor to:
receive a request to retrieve simulation data from a memory of a computing system, the request including a property key identifying the simulation data to be retrieved;
search the property key in a map, the map storing associations between a plurality of property keys and memories where simulation data associated with a corresponding property key is stored, comprising:
identifying a middle test entry in the map;
comparing the property key of the request to a property key of the middle test entry; and
selecting a subset of the map based on the comparison, comprising:
responsive to determining that the property key of the request is less than the property key of the middle test entry in a predefined lexicographical order, selecting a lower half of the map, and
responsive to determining that the property key of the request is not less than the property key of the middle test entry in the predefined lexicographical order, selecting an upper half of the map;
retrieve the memory for the requested simulation data; and
access the retrieved memory to obtain the requested simulation data.

15. The non-transitory computer-readable storage medium of claim 14, wherein comparing the property key of the request to a property key of the middle test entry comprises:
identifying a first element of the property key of the request;
identifying a first element of the property key of the middle test entry; and
comparing the first element of the property key of the request to the first element of the property key of the middle test entry.

16. The non-transitory computer-readable storage medium of claim 15, wherein comparing the property key of the request to a property key of the middle test entry further comprises:
responsive to determining that the first element of the property key of the request is the same as the first element of the property key of the middle test entry:
determining whether the property key of the request includes additional elements;
responsive to determining that the property key of the request includes additional elements:
identifying a next element of the property key of the request,
identifying a next element of the property key of the middle test entry, and
comparing the next element of the property key of the request to the next element of the property key of the middle test entry.

17. The non-transitory computer-readable storage medium of claim 15, wherein comparing the property key of the request to a property key of the middle test entry further comprises:
responsive to determining that the first element of the property key of the request is the same as the first element of the property key of the middle test entry:
determining whether the property key of the request includes additional elements; and
responsive to determining that the property key of the request does not include additional elements, determining that the property key of the request is not less than the property key of the middle test entry.

18. The non-transitory computer-readable storage medium of claim 15, wherein comparing the property key of the request to a property key of the middle test entry further comprises:
responsive to determining that the first element of the property key of the request is not the same as the first element of the property key of the middle test entry:
determining whether the first element of the property key of the request is less than the first element of the property key of the middle test entry.

19. The non-transitory computer-readable storage medium of claim 18, wherein determining whether the first element of the property key of the request is less than the first element of the property key of the middle test entry comprises:
determining whether a predefined compare-able identifier associated with the first element of the property key of the request is less than a predefined compare-able identifier associated with the first element of the property key of the middle test entry.

20. A system comprising:
a processor; and
a non-transitory computer-readable storage medium configured to store instructions, the instructions when executed by a processor cause the processor to:
receive a request to retrieve simulation data from a memory of a computing system, the request including a property key identifying the simulation data to be retrieved;
search the property key in a map, the map storing associations between a plurality of property keys and memories where simulation data associated with a corresponding property key is stored, comprising:
identifying a middle test entry in the map;
comparing the property key of the request to a property key of the middle test entry; and
selecting a subset of the map based on the comparison, comprising:
responsive to determining that the property key of the request is less than the property key of the middle test entry in a predefined lexicographical order, selecting a lower half of the map, and
responsive to determining that the property key of the request is not less than the property key of the middle test entry in the predefined lexicographical order, selecting an upper half of the map;
retrieve the memory for the requested simulation data; and access the retrieved memory to obtain the requested simulation data.

* * * * *